Oct. 22, 1940.  V. W. THOMAS  2,219,168
STROBOSCOPIC ANALYZER
Filed Oct. 9, 1936  3 Sheets-Sheet 1
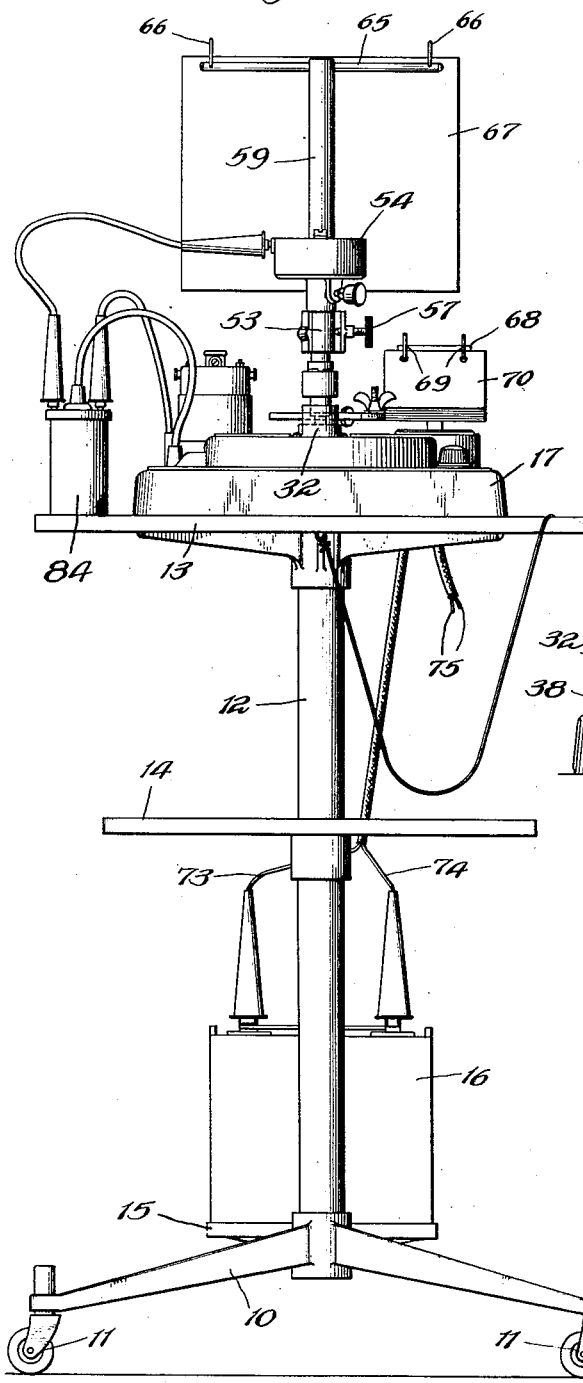
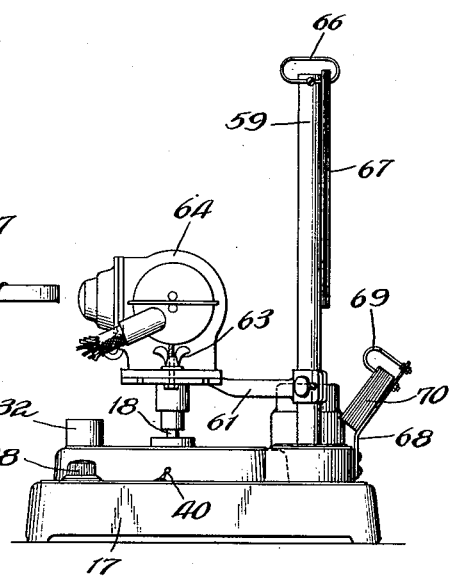
INVENTOR.
Victor W. Thomas
BY Kent W. Wonnell
ATTORNEY.

Oct. 22, 1940.   V. W. THOMAS   2,219,168
STROBOSCOPIC ANALYZER
Filed Oct. 9, 1936   3 Sheets-Sheet 2
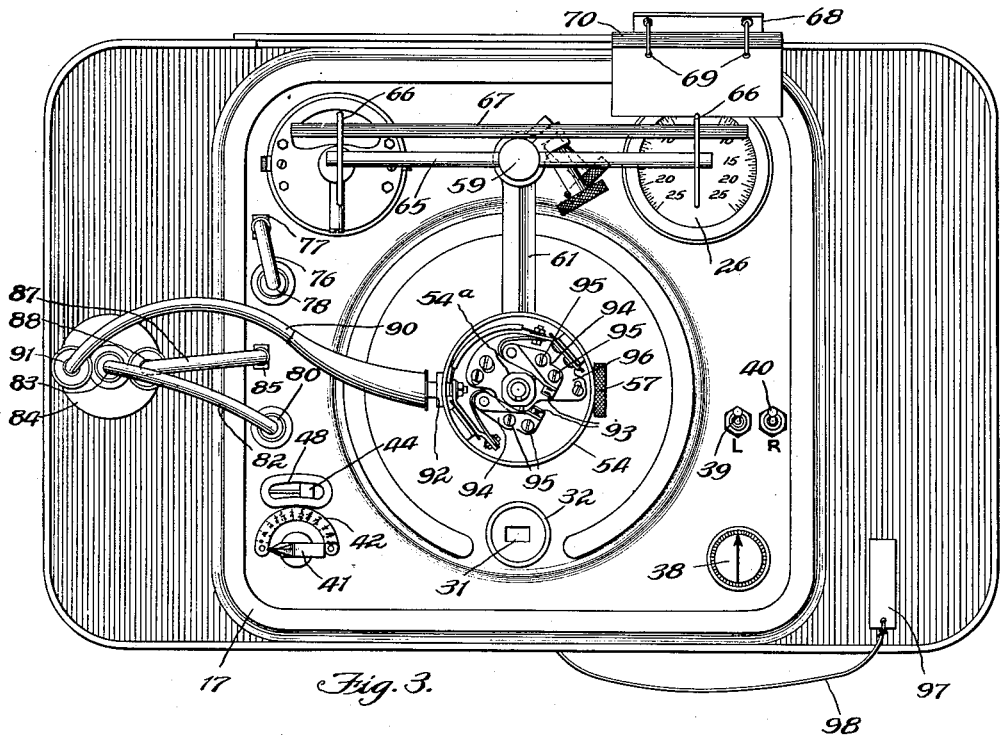
Fig. 3.
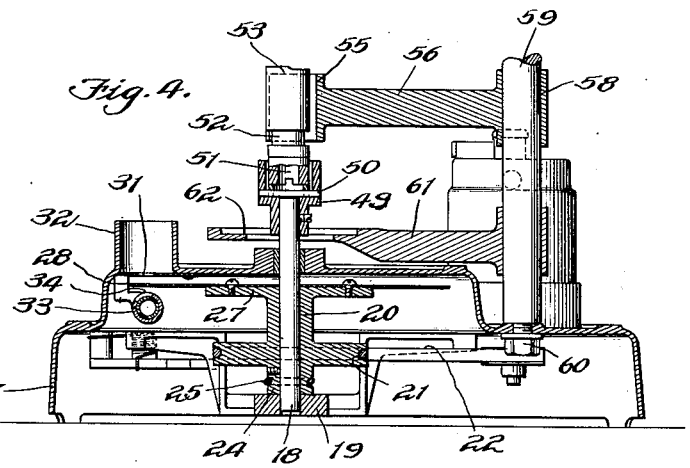
Fig. 4.
Fig. 7.
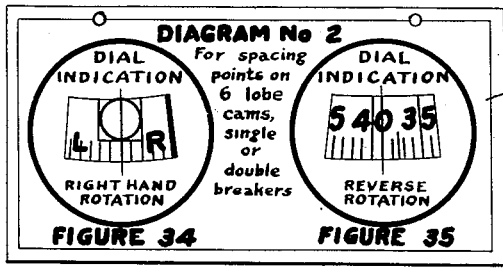
INVENTOR.
Victor W. Thomas
BY Kent W. Wonnell
ATTORNEY.

Oct. 22, 1940.  V. W. THOMAS  2,219,168
STROBOSCOPIC ANALYZER
Filed Oct. 9, 1936  3 Sheets-Sheet 3

INVENTOR.
Victor W. Thomas
BY Kent W. Worrall
ATTORNEY.

Patented Oct. 22, 1940

2,219,168

UNITED STATES PATENT OFFICE 2,219,168

STROBOSCOPIC ANALYZER

Victor W. Thomas, Waukegan, Ill., assignor to Edward A. Harrington, trustee, Waukegan, Ill.

Application October 9, 1936, Serial No. 104,809

11 Claims. (Cl. 177—311)

This invention relates in general to a stroboscopic analyzer and is more particularly described as a device for observing and accurately setting the ignition points and synchronizing the circuit interruptions of an internal combustion engine, but may have a more general use wherever applicable.

In this analyzer the lamp is of the electronic tube or single electrode type, fixed in position, and related to a transparent calibrated rotating dial which actually shows the exact time at which the spark takes place in the cylinder of a motor with no time lag of lamps dying out or ignition coil lag to be considered.

It is therefore an important object of the present invention to provide a stroboscopic analyzer of the single electrode lamp type in which the lamp is located in a fixed position with respect to a transparent calibrated dial which is rotated at the same speed as the ignition distributor under test for determining exactly the condition which exists as each lobe of the cam strikes the rubbing block of the ignition breaker arm and at the exact instant that the spark takes place in the cylinder.

A further object of the invention is in the provision of an easily operable and reversible type of stroboscopic analyzer to measure cam angles and synchronize one with the other where two interrupters are used which is simple in construction and effective and efficient in operation.

Other objects will appear from the specification and the drawings illustrating a preferred embodiment of the invention, and in which—

Fig. 1 is a front elevation of a portable stand upon which an analyzer is supported and set up for testing an ignition circuit breaker for an internal combustion engine;

Fig. 2 is a side elevation of the analyzer with a different type of ignition breaker supported thereon;

Fig. 3 is a top plan view of the structure shown in Fig. 1;

Fig. 4 is a sectional view of the analyzer;

Fig. 7 shows one of the diagram indicators.

Figure 5:
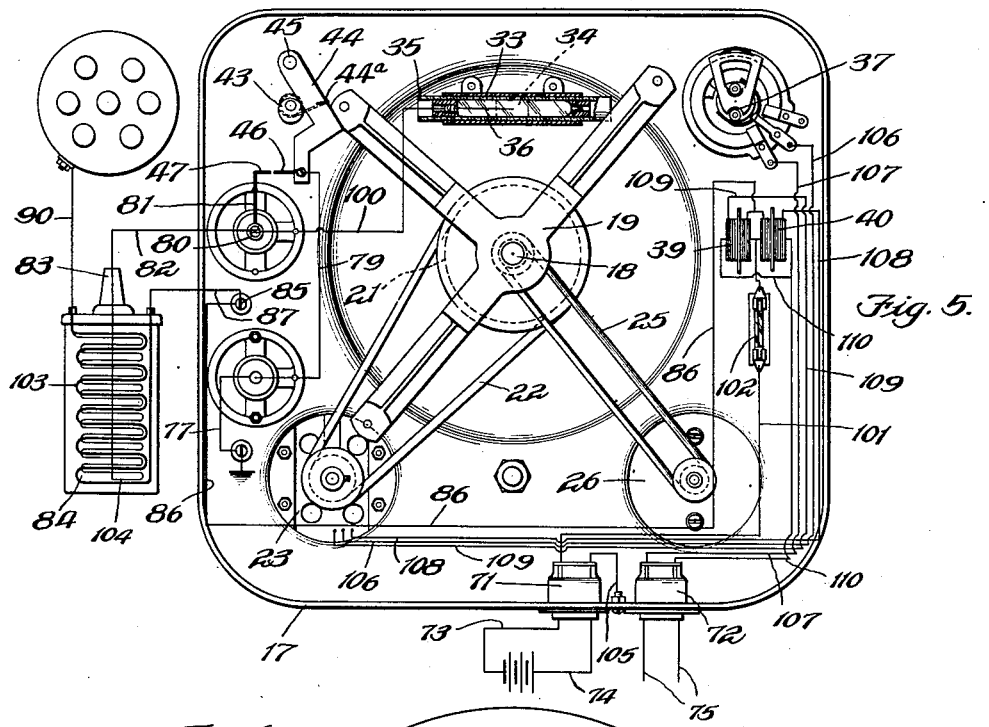
Fig. 5 is a view of the under side of the analyzer, including a diagrammatic arrangement of the electrical connections.

In carrying out this invention an ignition breaker for an internal combustion engine is attached to a rotating member which carries the graduated stroboscopic dial at the same speed as the cam in the breaker. Under the transparent dial is a neon lamp that flashes in a fraction of a thousandth part of a second. This flash takes place the instant the secondary current of an ignition coil strikes the spark gap as this lamp is connected to one side of it. The instant the secondary spark strikes the gap which is the actual time that the spark is applied to the gas in the cylinder of a motor, there is a flash of light under the transparent dial. This flash of light is of such a short duration that the degree numbers on the rotating dial visible through the sight opening above the neon lamp will look as though they were standing still. By this means the exact timing of the ignition apparatus may be observed for each lobe of the cam, as well as for each interrupter, so that they may be varied and accurately set to a definite number of degrees, and to produce the most advantageous and efficient result in the operation of the motor.

Referring now more particularly to the drawings, the analyzer is mounted upon a stand comprising a base 10 having casters 11 upon which it is freely movable for supporting a post 12 at the top of which is a table or plate 13. Below the top is a shelf 14 and on the base is a battery shelf 15 upon which a storage battery 16 is carried.

The analyzer proper comprises a metal base 17 preferably less in width than the top plate 13 and medially mounted in the base is a shaft 18 having a bearing spider 19 at the lower end of the shaft and secured to the under side of the base as shown more celarly in Fig. 5.

Secured to the shaft 18 is a hub member 20 which has a large pulley portion with a groove 21 for a driving belt 22 from an electric motor 23, a reduced belt groove 24 for a belt 25 which is connected to a tachometer 26, and a flange 27 to which a transparent calibrated dial is attached.

Figure 6:
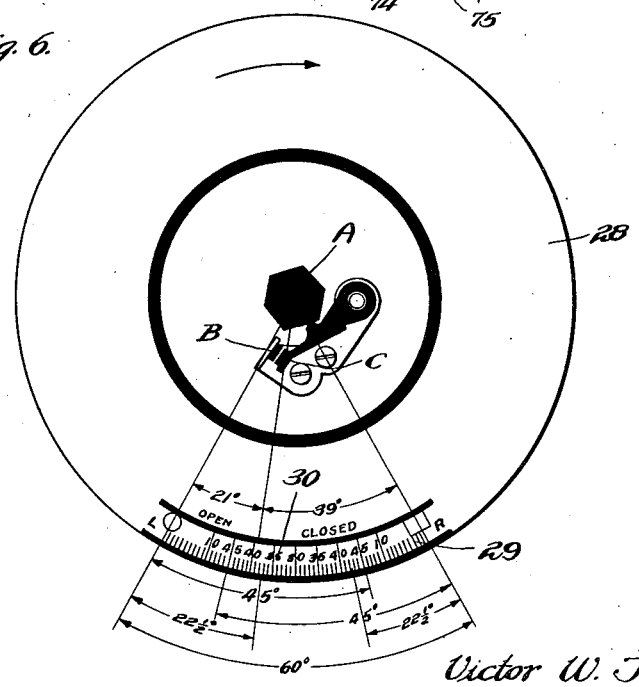
Fig. 6 is a view of the rotatable stroboscopic dial illustrating also the relation of a cam and an ignition breaker with relation to the graduations thereof.

This dial has a calibrated portion extending beyond the flange and embracing a sixty degree section of the dial as shown in Fig. 6. At the edge of this section of the dial are graduations 29, and adjacent thereto are numerals 30 indicating degrees corresponding to the graduations. This portion of the dial is visible from the upper side of the base through a sight opening 31 at the bottom of an upwardly extending sight tube 32. A "reading line" so designated in Fig. 3 is marked in alignment on opposite sides of the sight opening 31 and forms an accurate reference line for the dial indications and graduations which are visible in the opening. Supported in line with the sight opening and below the disc 28 at the under side of the casing 17 is a metal holder 33 having a sight opening 34 at its upper side and adapted to receive a short section of glass tubing 35 as an insulator in which a neon lamp 36 of the gaseous discharge type is inserted so that it will be directly below the sight openings 34 and 31 and in line with the graduations 29 and 30 of the rotatable dial 28.

At one side of the base is a rheostat 37 having an operating knob 38 for controlling the speed of the motor 23. Adjacent thereto are switches 39 and 40 for operating the motor in reverse directions in accordance with the speed setting of the rheostat and the tachometer as shown more clearly in Fig. 3, is provided with similar graduations at both sides of a zero point to indicate the different speeds in both directions of rotation of the motor. An adjustable calibrated spark gap is also provided in the base and comprises a rotatable indicator 41 movable over a graduated dial 42 and carrying a cam 43 at the under side of the base for engaging the arm 44 held against the cam by a spring 44a, mounted on a pivot 45 at one side of the cam and carrying a contact member 46 movable relatively to a fixed contact member 47, the two constituting an adjustable spark gap which is also visible through a sight opening 48 in the base.

Attached at the upper end of shaft 18 is a chuck 49 having a transverse driving pin therein and an adaptor 51 for engaging the lower end of an ignition breaker shaft 52 rotatable in a sleeve 53 extending from the ignition breaker casing 54 which is secured in a sleeve 55 at the end of an arm 56 by a set screw 57 for adjusting the ignition breaker and its breaker cam 54a therein in any desired position. This arm 56 in turn is supported at its other end by a clamp sleeve portion 58 which engages a stub shaft 59 fixedly mounted at the rear of the base and from the under side thereof by a fastening bolt 60.

This shaft also supports another arm 61 having an attaching portion 62 at its outer end with thumb screws 63 for engaging an ignition breaker 64 of a different type and supporting it in position so that its cams and ignition devices are rotated in timed relation to the shaft 18. Either one of these arms 56 and 61 may be used but when the lower one is used the upper one is raised out of the way or removed from the supporting post or shaft 59.

At the upper end of the shaft or post is a cross piece 65 having ring guides 66 at its ends for supporting directional and instruction sheets 67. Also located at the rear of the base is a bent plate 68 carrying ring guides 69 for supporting a number of diagram indicators 70 which contain directions for the different kinds of cams and breakers to be tested.

At the rear of the base are connection plugs 71 and 72, the former for receiving the conductors 73 and 74 from the battery 16 and the latter to receive conductors 75 from a suitable source of current supply for operating the motor 23.

At the left side of the base as shown in Fig. 3 is a short conductor 76 connected at one end in a ground post 77 and at the other end inserted in a socket 78 which is connected at the under side of the base by a conductor 79 with the movable contact 46 on the spark gap contact arm 44. A high tension socket 80 is connected by a conductor 81 with the fixed spark gap contact 47 and a high tension cable 82 is insertable at one end in the socket 80, the other end being connected to a high tension terminal 83 of an ignition coil 84. A socket 85 is connected by a conductor 86 in the base with the low tension sides of the reversing switches 39 and 40 and a conductor 87 is inserted at one end in the socket 85 and the other end is connected to a positive primary coil terminal 88 of the ignition coil 84.

As thus set up the ignition coil 84 need only be connected to the ignition breaker by means of a conductor 90 attached at one end to a high tension coil terminal 91 and at the other end to a contact 92 on the ignition breaker or distributor case.

In operation the ignition coil 84 has its terminals thus connected to the electrical connections of the analyzer and to the circuit breaker or distributing device which is to be tested. Such device is connected through the chuck 49 with the shaft 18 and the distributor is adjusted and set in various rotative positions by means of the set screw 57 so that the time of making and breaking the contacts can be accurately observed through the sight opening and adjustments made to correct the setting of the breaker contacts.

In a circuit breaker or distributor of this kind there are fixed contacts 93 and movable contacts cooperating therewith mounted on pivoted arms 94 which are individually adjustable in a well known manner by screws 95 and some of the arms are bodily adjustable in a rotative direction upon a mounting plate 96. These breaker arms are actuated to make and break an ignition circuit for the spark plugs of an internal combustion engine by the distributor cam 54a and to cut off one or the other of these ignition devices. An insulating member in the form of a thin card 97 is provided usually attached to some fixed part of the stand by a cord 98, so that it may be inserted between the fixed and movable contacts of one of the ignition breakers while the other is being tested. The neon lamp 36 has a single terminal which is connected by a conductor 100 with the fixed contact 47 of the adjustable spark gap device so that the flash of this neon lamp takes place the instant that the secondary current of the ignition coil connected thereto by the conductor 82 strikes the spark gap. At this instant there is a flash of light under the transparent dial and these flashes are sufficiently rapid and of such short duration that the degree number 30 will appear through the sight opening 31 as if it were standing still and thereby locating the exact angular position of the break so that the ignition breakers can be accurately set to produce the best result.

In supplying current for the testing coil, current flows from the battery through conductor 73, plug 71, conductor 101, fuse 102, and through either of the adjacent poles of the switches 39 and 40, depending upon which one is closed, the common conductor 86 leading therefrom to the plug 85 and thence through conductors 87 to the positive primary 103 of the coil connected by conductor 90 to the distributor. The secondary winding 104 of the coil extends from the common terminal 91 thereof through the coil and out of the secondary coil plug 83 by way of conductors 82 and 81 to the fixed spark gap member 47 and by way of conductor 100 to the lamp 36. The movable contact 46 of the adjustable spark gap is connected by conductor 79, plug 78, conductor 76 and plug 77 to a ground on the frame of the base 17, the other side of the battery being also connected by conductor 74 through the plug 71 and a conductor 105 to a ground connection on the base 17.

For operating the motor 23 in either direction there are three conductors 106 leading to one terminal of the rheostat 37 and thence through a conductor 107 and plug 72 to one of the supply mains 75; and conductors 108 and 109 leading respectively to the corresponding terminals of the right and left hand switches 40 and 39, the other sides of which are connected by common conductors 110 through the plug 72 to the other side of the main 75.

Thus the closing of either switch 39 or 40 will actuate the motor 23 to rotate in one direction or the other which will be properly indicated upon the tachometer 26 and the speed may be adjusted by the rheostat 37. At the same time the closing of either switch will close a circuit through the primary winding of the coil 84 which when broken by the distributor will produce a corresponding timed flash of the stroboscopic lamp 36.

It will be noted that the graduations are confined to a 60° section of the rotating dial 28 as the repetition of the graduations and numerals entirely around the margin of the dial would only be confusing.

At the left there is a circle marked L centered on the left 60° line and 60° to the right is a square centered on the next 60° line marked R, these figures denoting the left and right hand limits respectively of the graduated section. Half way between the marks is a 30° mark and at each side thereof designating degrees are 35 and 45 with the 10° graduation marked at 10° from each of the left and right hand ends.

Assuming that a six lobed circuit breaker cam A, as shown in Fig. 6, is being rotated with the dial 28 in a right hand direction to test a circuit breaker consisting of a fixed contact B and a movable arm and contact C and that the distributor is properly adjusted so that the first break of the fixed and movable parts takes place at the circle on the left and the second opening of the points takes place at the square on the right which is just 60° from the circle on the left, the light flashed under the dial when the secondary spark strikes the neon tube as the points are opened at the circle and also flashed when the points opened at the square. Therefore the stroboscopic indication as observed through the sight opening 31 will be a circle inside of a square. Now if the direction of rotation of the cam A is reversed the points will then open at an angle which is shown to be 39°. This 39° indication therefore is the number of degrees that the points remain closed as this is the exact number of degrees from the contact angle of one lobe of the cam to the contact angle of the next lobe of the cam, assuming of course that the cam itself is perfect, which is not always the case. It is also evident that there are 21° from the 39° mark to the circle on the left, this being the number of degrees that the points are open, not read on the stroboscope but obtained by subtracting 39° from 60°.

The number of degrees that the cam is open is read from the circle or the square, depending upon the direction of rotation and the number of degrees that the points remain closed is always more than 30° for all distributors so that it is thus possible to use the 60° calibration with the numerals 35, 40 and 45 appearing at each side of the 30° mark and depending upon the direction of rotation.

This same principle is carried out in all distributors to determine the number of degrees the points B and C remain closed, sometimes called the cam angle, the contact angle, saturation period, excitation period, or dwell, for the coil. It follows therefore that on all distributors which have a left hand rotation the number of degrees the points remain closed are read from the line through the circle L. On all distributors that have a right hand rotating cam the number of degrees the points remain closed are read from the center line of the square R.

For all different types of automobiles and engines used therein a chart has been prepared indicating the number of cylinders, the direction of rotation of the cam, the number of cam lobes, the number of breakers, and the normal point spacing both closed and open, as well as the distributor speed in revolutions per minute and the degrees of maximum spark advance on the cam. These charts with the directions are contained on the cards 67 so that they are easily and quickly available for any particular engine under test. In general the six lobed cams for a six cylinder engine should be closed 39° and therefore open 21°. This applies in general to six or twelve cylinder cars. For four cylinder cars the closed spacing is 45° and the open spacing is 45°; for the eight and sixteen cylinder cars and either four or eight lobed cams the point spacing is 34° closed and 11° open. The combination of different types of engines, different cams, single or double breakers, direction of rotation, require different diagrams for illustrating the proper positions observed for right and left hand rotation through the stroboscopic sight opening 31 which appear on the cards 70 held in the ring 69 so that for any particular combination the required diagram is listed upon the cards 67 and in testing that particular engine the particular or required diagram is made conveniently visible by moving the cards 70 on the ring 69. Diagram No. 2 on the top card 70 is for spacing the points on a six lobed cam with a single or double breaker so that when properly set the dial indication for right and left hand rotation will be as indicated in Figures 34 and 35 on diagram 2. If these results are not obtained the points are adjusted to obtain the results by mechanically varying the adjustment of the breaker parts themselves which of course is the function of the mechanic or operator of the analyzer.

In this manner it is best to examine each lobe of the cam for each distributor which is done by releasing the set screw 57 and moving the distributor housing 54 a sufficient angle to bring the next lobe of the cam under the stroboscopic neon tube. When there are two circuit breakers in a distributor it is frequently desirable to examine each one separately and a separating device such as the fibre card 97 is inserted between the fixed and movable contacts of the breaker which is not under test. It is easily inserted and removed for testing either or both of the breakers.

Although explained particularly for use in connection with the ignition distributors of internal combustion engines, this analyzer is also valuable for other indications and uses. Worn distributor shaft or bearings are indicated by the dial numbers not appearing steady; weak contact tension springs will cause the dial numbers to jump and be unsteady and a miss is indicated in the vision tube of the analyzer. Condensers and ignition coils may be tested and compared with other condensers or coils; coils may be tested either off or on the engines; new ignition points, spark plugs can be tested and compared and the spacing of the spark plugs may be accurately adjusted and varied; and all indications are so clearly and definitely shown by the stroboscopic analyzer that an automobile owner can be shown and convinced of the improper setting and as readily assured of the accurate and proper setting indicated by the analyzer. Many other applications and uses are possible and become apparent to one who becomes acquainted with the analyzer and familiar with its operation.

Thus when a stroboscopic lamp is connected to one side of the spark gap and the lamp is also connected to the ground of the stroboscope motion of engine valves, valve springs, overhead rocker arms, ring gears, and in fact, any moving parts, they can be examined by adjusting the speed controlling rheostat so that the flashing of the stroboscope lamp occurs exactly at the same cycle as that of the moving part.

I claim:

1. The method of determining the contact angle of the breaker points of the ignition distributor mechanism of an internal combustion engine comprising: the rotation of the distributor rotor in one direction, the producing of a flow of electric current in a circuit at each opening of the breaker points, and the causing said flow of electric current to give an indication of the angular position of the distributor rotor with respect to a stationary reference at the instant of opening of the breaker points; the rotation of said distributor rotor in the opposite direction, the producing of a second flow of electric current in said circuit at each opening of the breaker points, the causing of said second flow of electric current to give an indication of the angular position of the distributor rotor with respect to the same stationary reference at the instant of opening of the breaker points; and the measuring of the angle between the first and second positions of the distributor rotor.

2. The method of determining the contact angle of the breaker points of the ignition distributor mechanism of an internal combustion engine comprising: the rotating of the distributor rotor in one direction, the producing of a flow of electric current in a circuit containing an electric lamp to cause said lamp to light at each opening of the breaker points and by its illumination indicate the angular position of the distributor rotor with respect to a stationary reference at the instant of opening of the breaker points; the rotating of said distributor rotor in the opposite direction, the producing of a second flow of electric current in said circuit containing said electric lamp to cause said lamp to light at each opening of the breaker points and by its illumination indicate the angular position of the distributor rotor with respect to the same stationary reference at the instant of opening of the breaker points, and the measuring of the angle between the first and second positions of the distributor rotor.

3. The method of determining the contact angle of the breaker points of the ignition distributor mechanism of an internal combustion engine comprising: the rotating of the distributor rotor in one direction, the producing of a spark discharge coincident with each opening of the breaker points, and the causing said spark discharge to give an indication of the angular position of the distributor rotor with respect to a stationary reference at the instant of opening of the breaker points; the rotating of said distributor rotor in the opposite direction, the producing of a second spark discharge coincident with each opening of the breaker points, the causing of said second spark discharge to give an indication of the angular position of the distributor rotor with respect to the same stationary reference; and the measuring of the angle between the first and second positions of the distributor rotor.

4. The method of determining the contact angle of the breaker points of the ignition distributor mechanism of an internal combustion engine comprising: the rotating of the distributor rotor in one direction, the producing of a voltage surge across the terminals of a gaseous discharge tube at each opening of the breaker points to cause said gaseous discharge tube to glow and by its illumination indicate the angular position of the distributor rotor with respect to a stationary reference at the instant of opening of the breaker points; the rotating of said distributor rotor in the opposite direction, the producing of a second voltage surge across the terminals of said gaseous discharge tube at each opening of the breaker points to cause said gaseous discharge tube to glow and by its illumination indicate the angular position of the distributor rotor with respect to the same stationary reference at the instant of opening of the breaker points; and the measuring of the angle between the first and second positions of the distributor rotor.

5. In a stroboscopic analyzer for determining the contact interval of the breaker points of the ignition distributor mechanism of an internal combustion engine, a dial having a transparent sector of sixty degrees and numerical indications within the said sector and terminal line distinctive marks, the numerals indicating ten degrees from either end, a central line of thirty degrees and thirty-five, forty and forty-five degrees at each side of the central line, a motor for rotating the dial in either direction and at various speeds, a speed indicator for indicating the speeds of the dial in either direction, means for producing a flow of electric current in a circuit at each opening of the breaker points, and a lamp in said circuit to give an indication of the position of the distributor rotor at the instant of opening of the breaker points with respect to a stationary reference from either end of said sector, depending upon the direction of rotation of the dial.

6. A stroboscopic analyzer for automobile ignition distributor mechanism of an internal combustion engine comprising: a rotatable shaft for connection with the distributor mechanism, a dial member secured to and rotatable with the shaft and means forming a graduated transparent sector therefor, a motor for rotating the dial in either direction and at various speeds, and a speed indicator therefor, a lamp and an electric circuit therefor including the distributor mechanism for producing a flow of current to light the lamp at each opening of the breaker points to give an indication of the instant of opening the breaker points as referred to the graduations at either end of said sector, depending upon the direction of rotation of the dial whereby the period of contact of any ignition breaker can be determined by measuring the angle between the reference points indicated in opposite rotations of the dial.

7. In a stroboscopic analyzer for determining the contact interval of the cam-operated breaker points of the ignition distributor mechanism of an internal combustion engine, a rotatable dial with graduations therefor in a sector, means including a lamp in a circuit with the ignition breaker to interrupt the flow of current in a circuit at each opening of the breaker points, a motor for rotating the dial and cam together in either direction, the lamp giving an indication on said dial of the angular position of the distributor cam with respect to a stationary reference at the instant of opening of the breaker points depending upon the direction of rotation of the cam and dial, the contact interval for any cam being determined by the difference between the circuit breaks as indicated by the lamp in the reverve rotations of the cam and dial.

8. In a stroboscopic analyzer for determining the contact interval of the breaker points of the ignition distributor mechanism of an internal combustion engine, a dial graduated in degrees and rotatable with the distributor mechanism, a lamp in a circuit with the ignition breaker points and energized at the opening of the breaker points to give an indication with respect to the dial of the angular position of the break, means to rotate the dial and distributor together in either direction, the contact interval of the breaker points being measured with respect to the dial as the angle between the lamp indicated openings of the circuit at the reverse rotations of the dial and distributor.

9. A stroboscopic analyzer in accordance with claim 8, in which the circuit including the lamp also includes means forming a variable calibrated spark gap to vary the circuit interrupting illumination of the lamp.

10. In a stroboscopic analyzer for determining the contact interval of the cam-operated breaker points of the ignition distributor mechanism of an internal combustion engine, a rotatable dial with graduations therefor in a sector, means including a lamp in a circuit with the ignition breaker to interrupt the flow of current in a circuit at each opening of the breaker points, a motor for rotating the dial and cam together in either direction, the lamp giving an indication on said dial of the angular position of the distributor cam with respect to a stationary reference at the instant of opening of the breaker points depending upon the direction of rotation of the cam and dial, the contact interval for any cam being determined by the difference between the circuit breaks as indicated by the lamp in the reverve rotations of the cam and dial.

10. In a stroboscopic analyzer for determining the contact interval of the cam-operated breaker points of the ignition distributor mechanism of an internal combustion engine, a rotatable dial member and means forming a graduated sector therefor, means including a lamp in circuit with the ignition breaker to interrupt the flow of current in the circuit at each opening of the breaker points, a motor for rotating the dial and cam together in either direction, the lamp giving an indication by means of the dial of the angular position of the distributor cam with respect to the graduations of the sector at the instant of opening of the breaker points, depending upon the direction of rotation of the cam and dial, the contact interval for any cam being determined by the difference between the circuit breaks as indicated by the lamp in the reverse rotations of the cam and dial.

11. In a stroboscopic analyzer for determining the contact interval of the breaker points of the ignition distributor mechanism of an internal combustion engine, a dial member rotatable with the distributor mechanism, and means forming a sector with graduations in degrees relating to the dial with indications which may be read from either end of the sector, a lamp in circuit with the ignition breaker points and energized at the opening thereof to give an indication by means of the lamp with respect to the graduations of the angular positioning of the breaker, depending upon the direction of rotation of the dial, means to rotate the dial and distributor together in either direction, the contact interval of the breaker points being measured with respect to the graduations as the angle in degrees between the lamp indicated openings of the circuit at the reverse rotations of the dial and distributor.

VICTOR W. THOMAS.